US008291051B2

(12) United States Patent
Amidon et al.

(10) Patent No.: US 8,291,051 B2
(45) Date of Patent: Oct. 16, 2012

(54) COLLABORATIVE CONFIGURATION OF A MEDIA ENVIRONMENT

(75) Inventors: Christopher M. Amidon, Apex, NC (US); Alfredo C. Issa, Apex, NC (US); Richard J. Walsh, Raleigh, NC (US); Gary Black, Cary, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 81 days.

(21) Appl. No.: 13/012,263

(22) Filed: Jan. 24, 2011

(65) Prior Publication Data

US 2011/0125989 A1 May 26, 2011

Related U.S. Application Data

(63) Continuation of application No. 11/394,767, filed on Mar. 31, 2006, now Pat. No. 7,925,723.

(51) Int. Cl.
*G06F 15/177* (2006.01)
*G06F 15/16* (2006.01)
*G06F 17/00* (2006.01)
*G06N 5/00* (2006.01)

(52) U.S. Cl. ......... 709/220; 706/45; 706/908; 707/748; 709/203

(58) Field of Classification Search ............ 709/203, 709/220; 706/45, 908; 707/748
See application file for complete search history.

(56) References Cited

U.S. PATENT DOCUMENTS

| | | | |
|---|---|---|---|
| 5,790,426 A | 8/1998 | Robinson | |
| 5,809,493 A | 9/1998 | Ahamed et al. | |
| 5,945,988 A | 8/1999 | Williams et al. | |
| 6,014,638 A | 1/2000 | Burge et al. | |
| 6,064,980 A | 5/2000 | Jacobi et al. | |
| 6,266,649 B1 | 7/2001 | Linden et al. | |
| 6,349,301 B1 | 2/2002 | Mitchell et al. | |
| 6,392,664 B1 | 5/2002 | White et al. | |
| 6,426,778 B1 | 7/2002 | Valdez, Jr. | |
| 6,438,579 B1 | 8/2002 | Hosken | |

(Continued)

FOREIGN PATENT DOCUMENTS

EP 1473650 A1 11/2004

(Continued)

OTHER PUBLICATIONS

No Author, "Yahoo! Avatars," Yahoo! Messenger, accessed Mar. 26, 2007, 2 pages.

(Continued)

*Primary Examiner* — George C Neurauter
(74) *Attorney, Agent, or Firm* — Withrow & Terranova, PLLC

(57) ABSTRACT

A system and method for collaboratively providing configurations for a media environment are provided. In general, configuration events from a number of media environments are collected and provided to a Collaborative Configuration System (CCS) server. Based on the configuration events, the CCS server generates and provides recommended configurations to a media environment. The recommended configurations may be generated prior to or after receiving a request for recommended configurations from the media environment. In one embodiment, the recommended configurations are provided as a recommended configuration profile providing a set of configurations to be applied at the media environment. In another embodiment, the recommended configurations are provided as a CCS track associated with a particular media presentation. The CCS track includes configuration changes to be applied to the media environment for a number of time slices of the media presentation during playback of the media presentation.

16 Claims, 11 Drawing Sheets

U.S. PATENT DOCUMENTS

| | | | |
|---|---|---|---|
| 6,448,980 B1 | 9/2002 | Kumar et al. | |
| 6,453,294 B1 | 9/2002 | Dutta et al. | |
| 6,530,083 B1 | 3/2003 | Liebenow | |
| 6,538,668 B1 | 3/2003 | Ruberg et al. | |
| 6,595,781 B2 | 7/2003 | Sutton | |
| 6,601,103 B1 | 7/2003 | Goldschmidt Iki et al. | |
| 6,618,714 B1 | 9/2003 | Abrahams | |
| 6,637,032 B1 | 10/2003 | Feinleib | |
| 6,681,357 B2 | 1/2004 | Pendurkar | |
| 6,795,972 B2 | 9/2004 | Rovira | |
| 6,813,775 B1 | 11/2004 | Finseth et al. | |
| 6,832,388 B1 | 12/2004 | Du Val | |
| 6,889,207 B2 | 5/2005 | Slemmer et al. | |
| 6,910,186 B2 | 6/2005 | Kim | |
| 6,952,716 B1 | 10/2005 | Robb et al. | |
| 7,034,678 B2 | 4/2006 | Burkley et al. | |
| 7,036,082 B1 | 4/2006 | Dalrymple et al. | |
| 7,043,464 B2 | 5/2006 | Abrahams | |
| 7,079,176 B1* | 7/2006 | Freeman et al. | 348/207.1 |
| 7,107,549 B2 | 9/2006 | Deaton et al. | |
| 7,545,868 B2* | 6/2009 | Kennedy et al. | 375/259 |
| 7,574,693 B1* | 8/2009 | Kemink | 717/121 |
| 7,650,316 B2* | 1/2010 | Peck et al. | 706/11 |
| 7,797,345 B1 | 9/2010 | Martino et al. | |
| 7,849,420 B1 | 12/2010 | Amidon et al. | |
| 2001/0021920 A1 | 9/2001 | Ikeda | |
| 2001/0037376 A1 | 11/2001 | Ullman et al. | |
| 2002/0033848 A1 | 3/2002 | Sciammarella et al. | |
| 2002/0035600 A1 | 3/2002 | Ullman et al. | |
| 2002/0035601 A1 | 3/2002 | Ullman et al. | |
| 2002/0038344 A1 | 3/2002 | Ullman et al. | |
| 2002/0045987 A1* | 4/2002 | Ohata et al. | 701/213 |
| 2002/0072922 A1 | 6/2002 | Suzuki et al. | |
| 2002/0112247 A1 | 8/2002 | Horner et al. | |
| 2002/0136414 A1* | 9/2002 | Jordan et al. | 381/58 |
| 2002/0159607 A1 | 10/2002 | Ford et al. | |
| 2002/0194586 A1 | 12/2002 | Gutta et al. | |
| 2003/0007092 A1 | 1/2003 | Sonner et al. | |
| 2003/0018971 A1 | 1/2003 | McKenna, Jr. | |
| 2003/0037333 A1* | 2/2003 | Ghashghai et al. | 725/46 |
| 2003/0079177 A1 | 4/2003 | Brintzenhofe et al. | |
| 2003/0122966 A1 | 7/2003 | Markman et al. | |
| 2004/0003392 A1 | 1/2004 | Trajkovic et al. | |
| 2004/0015241 A1* | 1/2004 | Brown et al. | 700/12 |
| 2004/0034638 A1* | 2/2004 | Brown et al. | 707/10 |
| 2004/0098754 A1 | 5/2004 | Vella et al. | |
| 2004/0189701 A1 | 9/2004 | Badt, Jr. | |
| 2004/0199867 A1 | 10/2004 | Brandenborg | |
| 2004/0210947 A1 | 10/2004 | Shusman | |
| 2004/0237120 A1 | 11/2004 | Lewin et al. | |
| 2004/0239681 A1 | 12/2004 | Robotham et al. | |
| 2004/0244057 A1 | 12/2004 | Wallace et al. | |
| 2005/0010637 A1 | 1/2005 | Dempski et al. | |
| 2005/0015815 A1 | 1/2005 | Shoff et al. | |
| 2005/0060741 A1 | 3/2005 | Tsutsui et al. | |
| 2005/0060746 A1 | 3/2005 | Kim | |
| 2005/0137015 A1 | 6/2005 | Rogers et al. | |
| 2005/0166257 A1 | 7/2005 | Feinleib et al. | |
| 2005/0229233 A1 | 10/2005 | Zimmerman et al. | |
| 2005/0262539 A1 | 11/2005 | Barton et al. | |
| 2005/0264647 A1 | 12/2005 | Rzeszewski et al. | |
| 2006/0111188 A1 | 5/2006 | Winkler | |
| 2006/0143068 A1 | 6/2006 | Calabria | |
| 2006/0195515 A1 | 8/2006 | Beaupre et al. | |
| 2006/0235790 A1 | 10/2006 | Jung et al. | |
| 2006/0271997 A1 | 11/2006 | Jacoby et al. | |
| 2006/0282391 A1 | 12/2006 | Peterka et al. | |
| 2007/0091206 A1 | 4/2007 | Bloebaum | |
| 2007/0127889 A1 | 6/2007 | Seo | |
| 2007/0174304 A1 | 7/2007 | Shrufi et al. | |
| 2007/0214427 A1* | 9/2007 | Peck et al. | 715/771 |
| 2007/0250844 A1 | 10/2007 | Collacott | |
| 2007/0265992 A1 | 11/2007 | Heidenreich et al. | |
| 2008/0052242 A1 | 2/2008 | Merritt et al. | |
| 2008/0091521 A1 | 4/2008 | Ho et al. | |
| 2008/0126943 A1 | 5/2008 | Parasnis et al. | |
| 2008/0177779 A1 | 7/2008 | Cancel et al. | |
| 2008/0184301 A1 | 7/2008 | Boylan et al. | |
| 2008/0189744 A1 | 8/2008 | Schein et al. | |
| 2008/0255977 A1 | 10/2008 | Altberg et al. | |
| 2009/0037822 A1 | 2/2009 | Kandekar et al. | |
| 2010/0169910 A1 | 7/2010 | Collins et al. | |

FOREIGN PATENT DOCUMENTS

| | | |
|---|---|---|
| EP | 1689143 A1 | 8/2006 |
| WO | 0124524 A1 | 4/2001 |
| WO | 2005020129 A2 | 3/2005 |

OTHER PUBLICATIONS

No Author, "Avatars—Yahoo! Messenger," accessed May 17, 2007, http://messenger.yahoo.com/avatars.php, 2 pages.

No Author, "About Us," Cyworld, accessed Mar. 26, 2007, http://us.cyworld.com/main/aboutus/aboutus.php, 3 pages.

No Author, "Main", Cyworld, http://us.cyworld.com/main/index.php, accessed May 17, 2007, 4 pages.

No Author, "Gravatar—Globally Recognized Avatars," Gravatar: Your Identity—Online, accessed Mar. 26, 2007, http://site.gravatar.com, 2 pages.

No Author, "Gravatar—Globally Recognized Avatars," Gravatar: Your Identity—Online, accessed May 17, 2007, http://site.gravatar.com, 1 page.

Krol, C., "RSS ad programs feed needs," B to B, Jul. 11, 2005, vol. 90, Issue 9, pp. 1-3, accessed Jul. 28, 2009.

No Author, "Welcome to Luskwood Creatures", Luskwood Creatures, accessed Mar. 26, 2007, http://www.luskwood.com/index.htm, 12 pages.

No Author, "Welcome to Luskwood Creatures," Luskwood Creatures, accessed May 17, 2007, http://www.luskwood.com/index.htm, 7 pages.

No Author, "Meez—Avatars for MySpace, Xanga and IM," Mashable!—The Social Networking Blog, Xanga and IM, accessed May 17, 2007, http://mashable.com/2006/08/22/meez-avatars-for-myspace-xanga-and-im, 17 pages.

No Author, "MySpace", myspace.com—a place for friends, accessed May 31, 2007, http:/www.myspace.com, 2 pages.

No Author, "myspace.com—a place for friends", MySpace, http://www.myspace.com, accessed Apr. 10, 2008, 2 pages.

No Author, "Pandora Radio—Listen to Free Internet Radio, Find New Music", Pandora Media, Inc., 2005, accessed May 31, 2007, http://www.pandora.com, 1 page.

No Author, "Personalize Skype—Invent Yourself," accessed May 17, 2007, http://skype.klonies.com/studio.php, 1 page.

No Author, "Personalize Skype—Invent Yourself," accessed Mar. 26, 2007, http://skype.klonies.com/studio.php, 1 page.

No Author, "Press Releases", Comverse, 2003, accessed May 17, 2007, http://www.comverse.com/press_releases.aspx?newsId=412, 3 pages.

No Author, "Skype to Debut New Avatar Product From Comverse: Klonies," Comverse, Jun. 7, 2006, accessed Mar. 26, 2007, http://www.comverse.com/press_releases_aspx?newsId=412, 4 pages.

El Kaliouby, R., et al., "FAIM: Integrating Automated Facial Affect Analysis in Instant Messaging," IUI '04, Jan. 13-16, 2004, 3 pages.

No Author, "Rhapsody—Free access to millions of songs online," Rhapsody Online, accessed May 31, 2007, http://www.rhapsody.com/home.html, 3 pages.

No Author, "Youniversal Branding", trendwatching.com, Jul. 2006, accessed Mar. 26, 2007, http://www.trendwatching.com/trends/YOUNIVERSALBRANDING.htm, 33 pages.

No Author, "Youniversal Branding", trendwatching.com, Jul. 2006, accessed May 17, 2007, http://www.trendwatching.com/trends/YOUNIVERSALBRANDING.htm, 31 pages.

Smith, S., "Tapping the Feed: In search of an RSS Money Trail," EContent, Mar. 2005, vol. 28, Issue 3, pp. 30-34, accessed Jul. 28, 2009.

Restriction/Election Requirement mailed Jun. 25, 2009, for U.S. Appl. No. 11/394,767.

Non-Final Rejection mailed Oct. 28, 2009, for U.S. Appl. No. 11/394,767.

Notice of Allowance mailed Jun. 25, 2010, for U.S. Appl. No. 11/394,767.

Notice of Allowance mailed Sep. 16, 2010, for U.S. Appl. No. 11/394,767.

Notice of Allowance mailed Nov. 5, 2010, for U.S. Appl. No. 11/394,767.

Notice of Allowance mailed Jan. 26, 2011, for U.S. Appl. No. 11/394,767.

* cited by examiner

COLLABORATIVE CONFIGURATION OF A MEDIA ENVIRONMENT

CROSS-REFERENCE TO RELATED APPLICATION

The present application is a continuation of U.S. patent application Ser. No. 11/394,767, filed on Mar. 31, 2006, the disclosure of which is hereby incorporated by reference in its entirety

FIELD OF THE INVENTION

The present invention relates to configuring a media environment and more particularly relates to a system and method providing collaborative configuration of a media environment.

BACKGROUND OF THE INVENTION

As the capabilities and performance of home entertainment systems continue to improve, configuration of these systems has become increasingly difficult. For most users, simply getting the system up and running is an accomplishment. Most users do not have the time, desire, or knowledge to configure their systems optimally. Further, the optimal configurations of the system may vary depending on the type of media being played, layout of the environment in which the system is located, time of day, and the like. Thus, there is a need for a system and method for configuring a user's home entertainment system and surrounding environment.

SUMMARY OF THE INVENTION

The present invention provides a system and method for collaboratively providing configurations for a media environment. In general, configuration events from a number of media environments are collected and provided to a Collaborative Configuration System (CCS) server. Based on the configuration events, the CCS server generates and provides recommended configurations to another media environment, which is to be configured. The recommended configurations may be generated prior to a request for recommended configurations from the media environment or dynamically in response to the request for recommended configurations from the media environment. In one embodiment, the recommended configurations are provided as a recommended configuration profile providing a set of configurations to be applied at the media environment. In another embodiment, the recommended configurations are provided as a CCS track associated with a particular media presentation, such as a movie, to be presented at the media environment. The CCS track may include initial configurations to be applied at the beginning of playback of the media presentation. In addition, for each of a number of time slices of the media presentation, the CCS track may include configuration changes to be applied to the media environment during playback of the media presentation.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method for collaboratively providing configurations for a media environment. In general, configuration events from a number of media environments are collected and provided to a Collaborative Configuration System (CCS) server. Based on the configuration events, the CCS server generates and provides recommended configurations to another media environment, which is to be configured. The recommended configurations may be generated prior to a request for recommended configurations from the media environment or dynamically in response to the request for recommended configurations from the media environment. In one embodiment, the recommended configurations are provided as a recommended configuration profile providing a set of configurations to be applied at the media environment. In another embodiment, the recommended configurations are provided as a CCS track associated with a particular media presentation, such as a movie, to be presented at the media environment. The CCS track may include initial configurations to be applied at the beginning of playback of the media presentation. In addition, for each of a number of time slices of the media presentation, the CCS track may include configuration changes to be applied to the media environment during playback of the media presentation.

Figure 1:
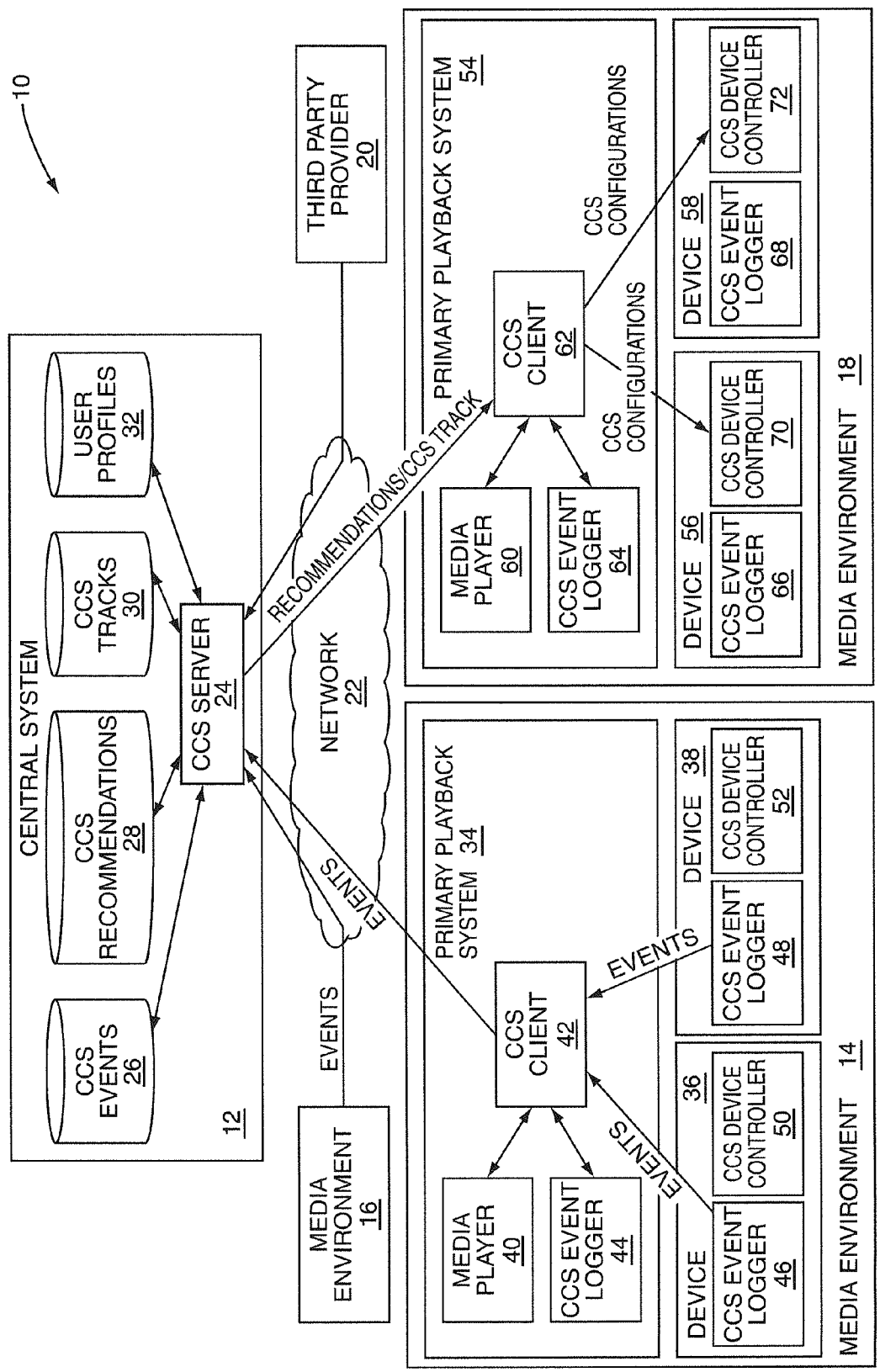
FIG. 1 illustrates a system for providing recommended configurations for a media environment according to one embodiment of the present invention.

FIG. 1 illustrates a system 10 providing recommended configurations according to one embodiment of the present invention. In general, the system 10 includes a central system 12, media environments 14-18, and an optional third party provider 20 interconnected by a network 22, which is preferably the Internet. As illustrated, the central system 12 includes a CCS server 24, a CCS events database 26, a CCS recommendations database 28, a CCS tracks database 30, and a user profiles database 32. Although the central system 12 is illustrated as a single block, the central system 12 may be implemented using a number of distributed CCS servers 24 and databases 26-32. This may be particularly beneficial when there are a large number of media environments 14-18 within the system 10.

The CCS server 24 may be implemented in hardware, software, or a combination of hardware and software. As discussed below in detail, the CCS server 24 generates recommended configurations for the media environments 14-18 based on configuration events from other media environments 14-18. In this example, the CCS server 24 generates recommended configurations for the media environment 18 based on configuration events from the media environments 14 and 16. The recommended configurations may be generated prior to receiving a request for recommended configurations from the media environment 18 or dynamically in response to receiving a request for recommended configurations from the media environment 18. As discussed below in detail, the recommended configurations may be a recommended configuration profile providing a set of recommended configurations to be applied at the media environment 18 or a CCS track providing recommended configurations for a particular media presentation. The CCS track may include recommended initial configurations for the media environment 18 and recommended configuration changes for a number of time slices of the media presentation.

The databases 26-32 may be implemented in a single storage device included within or associated with the CCS server 24. Alternatively, the databases 26-32 may be implemented on a number of distributed devices. The CCS events database 26 operates to store configuration events from each of the media environments 14-18. The configuration events are collected during playback of media presentations at the media environments 14-18. The configuration events may include media player settings, hardware and software settings, display device settings, settings of devices associated with the media environment, or changes thereto. For example, the configuration events may include an initial volume setting and volume changes during playback of a media presentation; initial display device settings and changes to the display device settings during playback of the media presentation; initial equalizer settings and changes to the equalizer settings during playback of the media presentation; initial telephone or mobile telephone settings and changes to the telephone or mobile telephone settings during playback; initial settings of lights in the media environment 14-18 and changes to the settings of the lights during playback; and the like. This list is not intended to be exhaustive. Numerous other types of configuration events may be collected depending on the particular arrangement of the media environments 14-18. However, it should be noted that the configuration events are not limited to only those events configuring devices directly effecting playback of the media presentation. Configuration events may also be collected from any device within and associated with the media environment 14-18 such as a telephone or lighting control system.

In general, a configuration event includes information identifying the media environment 14-18 at which the configuration event occurred, a media presentation during which the configuration event occurred, information defining a point during playback of the media presentation at which the configuration event occurred, and information defining the configuration event. The information identifying the media environment 14-18 may include an environment identifier (ID) of the media environment 14-18, where the environment ID may be assigned to the media environment 14-18 upon registration with CCS server 24. The information identifying the media environment 14-18 may also include the time of day, which may be an actual time, such as 2:30 p.m., or a generalized term for time of day, such as "morning," "afternoon," "evening," or "night." The information defining the configuration event generally includes information identifying a device upon which the configuration event occurred and information defining the configurations or configuration changes for the device. In one embodiment, the information identifying the device is a device ID assigned to the device either by the media environment 14-18 or by the CCS server 24. In another embodiment, the information identifying the device may include information such as a device type, a device make or model, a device operating system, a location of the device within the media environment 14-18, a public or private status of the device, enabled capabilities of the device, a connection speed of the device, a performance metric of the device, and software installed on the device. The information defining the configurations of the device varies depending on the device. For example, if the device is a display device used to display a media presentation, the configurations may include a contrast setting, a brightness setting, a sharpness setting, and the like. If the device is an equalizer, the configurations may include the settings of the equalizer. If the device is a controller associated with speakers, the configurations may be the volume level of the speakers. If the device is a lighting controller controlling the lighting in the media environment, the configurations may include the settings of the lighting controller. If the device is a telephone or mobile telephone, the configurations may include ringer settings controlling the ringer of the telephone or mobile telephone.

The CCS recommendations database 28 operates to store recommended configuration profiles for the media environments 14-18. As discussed below, the recommended configuration profiles are generated based on the configuration events from the media environments 14-18 and may be generated either before or after receiving a request for recommended configurations from the media environments 14-18. The CCS tracks database 30 operates to store one or more CCS tracks for a number of media presentations. The user profiles database 32 operates to store user profiles for primary users of the media environments 14-18. A user profile may include information identifying the primary user, which may be, for example, a name, address, telephone number, and email address of the primary user; demographic information regarding the primary user; and user preferences of the primary user. Demographic information may include age, sex, marital status, home address, hobbies, favorite movie or music genre, favorite movie, and the like. In addition, the demographic information may include information identifying any disabilities, such as a hearing disability, of the user.

The following discussion of the media environment 14 is equally applicable to the media environment 16. The media environment 14 may be a room in a user's home, office, or the like and generally includes a primary playback system 34 and, optionally, a number of devices 36, 38. Note that while only two devices 36, 38 are illustrated, the media environment 14 may include any number of devices 36, 38. The primary playback system 34 may be, for example, a personal computer, a set-top box associated with a cable or satellite television provider, a Digital Video Disc (DVD) player, a Digital Video Recorder (DVR), or the like. The devices 36, 38 may be, for example, a television or display associated with a media player 40 of the primary playback system 34, a sound system associated with the media player 40, an audio/video receiver associated with the media player 40, an equalizer associated with the media player 40, a mobile telephone, a Personal Digital Assistant (PDA), a lighting control system controlling lights in the media environment 14, or the like. The devices 36, 38 are equipped with either a wired interface or a local wireless interface such as a Bluetooth, Zigbee, or IEEE 802.11 wireless interface for communicating with the primary playback system 34.

The primary playback system 34 includes the media player 40, a CCS client 42, and a CCS event logger 44. The devices 36, 38 include CCS event loggers 46, 48 and CCS device controllers 50, 52, respectively. Within the primary playback system 34, the media player 40 may be implemented in hardware, software, or a combination of hardware and software and operates to play media presentations such as, but not limited to, movies, television content, audio content, or the like. The CCS client 42 may also be implemented in hardware, software, or a combination of hardware and software and may alternatively be embedded within the media player 40. The CCS client 42 generally operates to collect, and optionally filter, configuration events from the CCS event logger 44 for the primary playback system 34 and the CCS event loggers 46, 48 for the devices 36, 38 and provide the configuration events to the CCS server 24. In addition, the CCS client 42 may further operate to obtain recommended configurations for the primary playback system 34 and the devices 36, 38 from the CCS server 24.

The CCS event logger 44 may be implemented in hardware, software, or a combination of hardware and software. The CCS event logger 44 may alternatively be embedded within another application such as the media player 40. In general, the CCS event logger 44 operates to detect configurations of the media player 40 prior to and during playback of media presentations. The configurations of the media player 40 depend on the actual implementation. For example, if the media player 40 is a software application on a personal computer, then the configurations detected by the CCS event logger 44 may include window size, volume, equalizer settings, and the like. If the media player 40 is a DVD player, the configurations detected by the CCS event logger 44 may include aspect ratio, zoom, surround sound configurations, and the like.

As for the device 36, the CCS event logger 46 operates to detect the configurations of the device 36 prior to and during playback of media presentations on the primary playback system 34 and provide configuration events to the CCS client 42. The configurations of the device 36 vary depending on the device type. For example, if the device 36 is a television or display associated with the media player 40 and on which media presentations are displayed, the configurations of the device 36 may include, but are not limited to, volume, brightness, contrast, sharpness, aspect ratio, input selection, and the like. If the device 36 is an equalizer associated with the media player 40, the configurations of the device 36 may include the equalizer settings. If the device 36 is a surround sound system, the configurations of the device 36 may include volume level, bass level, treble level, and the like. If the device 36 is an audio/video receiver, the configurations may include various audio and video settings. The CCS device controller 50 is a controller through which the configurations of the device 36 are detected and controlled. Likewise, the CCS event logger 48 of the device 38 operates to detect the configurations of the device 38 prior to and during playback of media presentations on the primary playback system 34, and the CCS device controller 52 operates to control the configurations of the device 38.

The media environment 18 is like the media environments 14 and 16. The details of the media environment 18 are illustrated for ease of discussion of generating recommended configurations for the media environment 18 based on the configuration events from the media environments 14 and 16. Like the media environments 14 and 16, the media environment 18 includes a primary playback system 54 and devices 56 and 58. The primary playback system 54 includes a media player 60, a CCS client 62, and a CCS event logger 64. The devices 56 and 58 include CCS event loggers 66, 68 and CCS device controllers 70, 72, respectively.

The third party provider 20 is optional and may provide additional configuration events, recommended configuration profiles, CCS tracks, or any combination thereof. These configuration events, recommended configuration profiles, and CCS tracks may be provided as premium service for a fee. The third party provider 20 may be, for example, a broadcaster of television content, a movie production company, a manufacturer of some component of the media user environments 14-18, or the like.

The exemplary system 10 of FIG. 1 is illustrated such that configuration events are tracked at the media environments 14 and 16 and provided to the CCS server 24, wherein the CCS server 24 generates recommended configurations based on the configuration events and provides the recommended configurations to the media environment 18. However, it should be recognized that each of the media environments 14-18 preferably operates to both track configuration events and to request recommended configurations from the CCS server 24 when desired.

Figure 2:
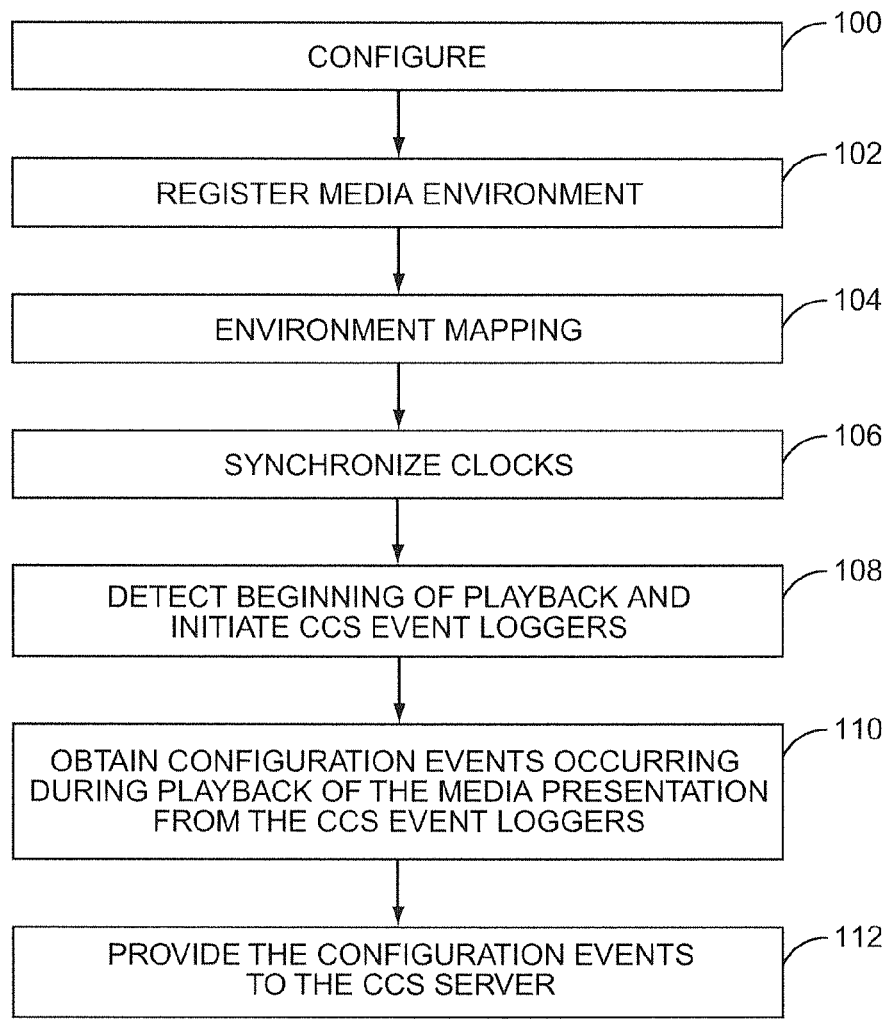
FIG. 2 illustrates the operation of the Collaborative Configuration System (CCS) client to collect configuration events within a media environment according to one embodiment of the present invention.

FIG. 2 illustrates the operation of the CCS client 42 according to one embodiment of the present invention. First, the CCS client 42 is configured (step 100). The CCS client 42 may be configured when desired by the user. For example, the CCS client 42 may be configured after initial installation or prior to playback of a media presentation. Configuration begins by first detecting devices within the media environment 14 having CCS event loggers and/or CCS device controllers. In this example, the primary playback system 34 and the devices 36 and 38 include the CCS event loggers 44, 46, and 48, respectively, and devices 36 and 38 include the CCS device controllers 50 and 52. As such, the primary playback system 34 and the devices 36 and 38 are detected by the CCS client 42. The user may then select one or more of the primary playback system 34, the device 36, and the device 38 to include in the configuration event tracking session during playback of an upcoming media presentation or during all future media presentations. For this example, assume that the user selects the primary playback system 34 and the user devices 36 and 38. In addition, the user may configure the CCS event loggers 44, 46, and 48 in order to define the configuration events that each of the CCS event loggers 44, 46, and 48 is allowed to track. Note that the user may configure the CCS event loggers 44, 46, and 48 via the CCS client 42 or by interacting with the CCS event loggers 44, 46, and 48.

The CCS client 42 may then interact with the CCS server 24 to register the media environment 14 with the CCS server 24 (step 102). While configuration and registration are illustrated as two steps, they may alternatively be combined into a single step. Further, although configuration and registration are illustrated as two steps, they may be performed continually in order to, for example, configure and register new devices as they enter the media environment 14 or reconfigure and register the devices in the media environment 14 when a device has left the media environment 14. However, the registration process may be repeated in order to edit the information provided during registration process. During registration, a primary user interacts with the CCS client 42 to provide information defining the media environment 14 to the CCS server 24. All or a portion of the information defining the media environment 14 may be stored in the user profiles database 32. The information defining the media environment 14 may include a user profile of a primary user of the media environment 14. The user profile may include information identifying the primary user, which may be, for example, a name, address, telephone number, and email address of the primary user; demographic information regarding the primary user; and user preferences of the primary user. Demographic information may include age, sex, marital status, home address, hobbies, favorite movie or music genre, favorite movie, and the like. In addition, the demographic information may include information identifying any disabilities, such as a hearing disability, of the user.

In addition, the information defining the media environment 14 may include dimensions of a room within which the media environment 14 is located, or a setting for the media environment 14, which may be, for example, "loud," "home," or "romantic." The information defining the media environment 14 may also include information such as, but not limited to, materials in the room, such as the materials of which the walls, ceiling, and floor of the room are made; position of windows in the room; position of furniture in the room; and the like. Further, in one embodiment, the information defining the media environment 14 may include a Computer-Aided Design (CAD) drawing of the media environment 14. As an example, the CAD drawing may be used by a human operator and associated with the CCS server 24 to extract desired parameters from the CAD drawing. The desired parameters may be the dimensions of the room, the layout of the room, and the like. Alternatively, the desired parameters may be automatically extracted from the CAD drawing by the CCS server 24.

In addition, for each of the media player 40 and the devices 36 and 38, the information defining the media environment may include device information. The device information may be provided by the user or automatically obtained from the device in full or in part. The device information may include, but is not limited to, a device type, a make or model of the device, and a location of the device within the media environment 14. In addition, the device information may include an operating system of the device, capabilities of the device, a connection speed of the device, performance metrics for the device, initial configurations or settings of the device, and information identifying software installed on the device. The device information may also include information classifying the device as public or private. If the device is public, configuration events are to be collected from the device. If the device is private, configuration events are not to be collected from the device. Once the media environment 14 has been registered, the CCS server 24 assigns an environment ID to the media environment 14, which is preferably globally unique.

The CCS server 24 then either automatically or through interaction with the primary user via the CCS client 42 operates to map the media environment 14 to one of a number of known environment types based on the information describing the media environment 14 provided during registration (step 104). The mapping process may be performed after registration, repeated prior to playback of a media presentation, or repeated when the arrangement of the media environment 14 or devices within the media environment 14 have changed. If the media environment 14 is substantially the same as one of the known environment types, the media environment 14 may be automatically mapped to the known environment type. If the media environment 14 is not substantially the same as one of the known user types or if the CCS server 24 is unable to unambiguously map the media environment 14 to one of the known environment types, then the CCS server 24 may provide information identifying two or more of the known environment types most closely matching the media environment 14 to the user. The user may then select one of the known environment types or decide to create a new environment type for the media environment 14.

Once configuration, registration, and environment mapping are complete, the CCS client 42 operates to synchronize clocks used by the CCS event loggers 44, 46, and 48 and the CCS client 42 with a clock used by the media player 40 (step 106). The CCS client 42 may perform this synchronization process prior to playback of a media presentation and, optionally, periodically during playback of the media presentation.

At this point, the CCS client 42 operates to initiate the CCS event presentation (step 108). The CCS client 42 then obtains configuration events from the CCS event loggers 44, 46, and 48 throughout playback of the media presentation (step 110). In one embodiment, the CCS event loggers 44, 46, and 48 provide initial configurations of the media player 40 and the devices 36 and 38 prior to or at the beginning of playback and configuration events corresponding to changes in the configurations of the media player 40 and the devices 36 and 38 during playback of the media presentation. The CCS event loggers 44, 46, and 48 may automatically provide configuration events to the CCS client 42 as they occur, periodically in a batch operation, or at the end of playback of the media presentation.

As stated above, the configuration events provided by the CCS event loggers 44, 46, and 48 may include the environment ID of the media environment, information identifying the media presentation during which the configuration event occurred, a time stamp indicating a point during playback of the media presentation at which the configuration event occurred, a device ID or other information identifying the device upon which the configuration event occurred, and the configurations or settings, or changes thereto, for the device.

After receiving the configuration events from the CCS event loggers 44, 46, and 48, the CCS client 42 provides the configuration events to the CCS server 24 (step 112). To ensure complete and accurate transmission, the CCS client 42 may optionally store the configuration events locally prior to sending the configuration events to the CCS server 24. The CCS client 42 may provide the configuration events to the CCS server 24 as they are received from the CCS event loggers 44, 46, and 48, periodically in a batch process, or at the end of playback of the media presentation. In addition, prior to sending the configuration events to the CCS server 24, the CCS client 42 may process the configuration events to add additional information and, optionally, to filter the configuration events.

More specifically, each configuration event provided to the CCS server 24 preferably includes information identifying the media environment 14-18 at which the configuration event occurred, the media presentation during which the configuration event occurred, information defining a point during playback of the media presentation at which the configuration occurred, and information defining the configuration event. In one embodiment, the CCS event loggers 44, 46, and 48 may only provide a time stamp defining the time at which the configuration event occurred and information identifying the configuration event. The time stamp may be a time and date at which the configuration event occurred or an offset from the beginning of playback. The information defining the configuration event generally includes information identifying the device upon which the configuration event occurred and information defining the configurations of the device. If necessary, the CCS client 42 may process the configuration events from the CCS event loggers 44, 46, and 48 to convert the time stamp for each configuration event to a time offset in seconds or minutes between the beginning of the media presentation and the time at which the configuration event occurred. In addition, the CCS client 42 may process the configuration events from the CCS event loggers 44, 46, and 48 to add the information identifying the media environment 14 at which the configuration event occurred and the media presentation during which the configuration event occurred.

The CCS client 42 may filter the configuration events prior to sending the configuration events to the CCS server 24 based on various criteria. Note that this filtering process may alternatively be performed by the CCS event loggers 44, 46, and 48. For example, the CCS client 42 may filter the configuration events to remove configuration events for volume changes occurring when a telephone call is received or ended. Note that in this case, the receiving and ending of a telephone call may be provided to the CCS client 42 as configuration events. As another example, the CCS client 42 may filter the configuration events to collapse, or combine, configuration events from the same device that occurred within a predetermined period of time, such as a number of seconds. As a third example, the CCS client 42 may filter the configuration events to remove configuration events for audio settings of devices on which other media or games are being played. As a fourth example, the CCS server 24 may only be interested in events from certain users, from certain devices 40, 36, 38 for certain media presentations, or the like. In this case, the CCS server 24 and the CCS client 42 may perform a handshaking operation either periodically or before collecting new configuration events for a media presentation during which the CCS server 24 and the CCS client 42 agree on the types of configuration events that are to be tracked and provided to the CCS server 24.

Figure 3:
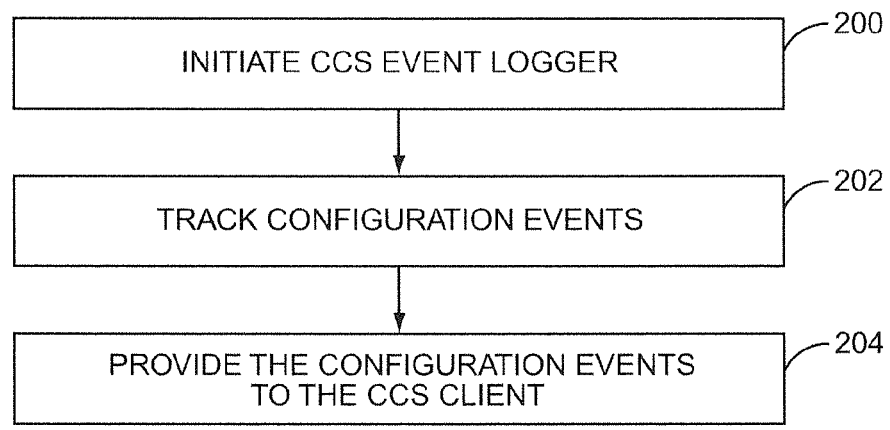
FIG. 3 illustrates the operation of a CCS event logger according to one embodiment of the present invention.

FIG. 3 illustrates the operation of the CCS event logger 44. However, this discussion is equally applicable to the CCS event loggers 46 and 48. First, the CCS event logger 44 is initiated by the CCS client 42 (step 200). Note that prior to initiation and, optionally, periodically thereafter, the CCS client 42 may communicate with the CCS event logger 44 in order to synchronize a clock of the CCS event logger 44 with the clock or clocks used by the CCS client 42 and the media player 40.

After the CCS event logger 44 is initiated, configuration events are tracked (step 202). More specifically, the CCS event logger 44 tracks configuration events on the media player 40. Upon detecting configuration events, the CCS event logger 44 generates configuration event data structures, which are generally referred to herein as the configuration events. The CCS event logger 44 provides the configuration events to the CCS client 42 as the configuration events occur, periodically in a batch process, or at the end of playback of the media presentation (step 204).

In addition, the CCS event logger 44 may filter the configuration events and provide only the filtered configuration events to the CCS client 42. For example, the CCS event logger 44 may filter the configuration events to collapse, or combine, configuration events occurring within a predetermined number of seconds.

Figure 4:
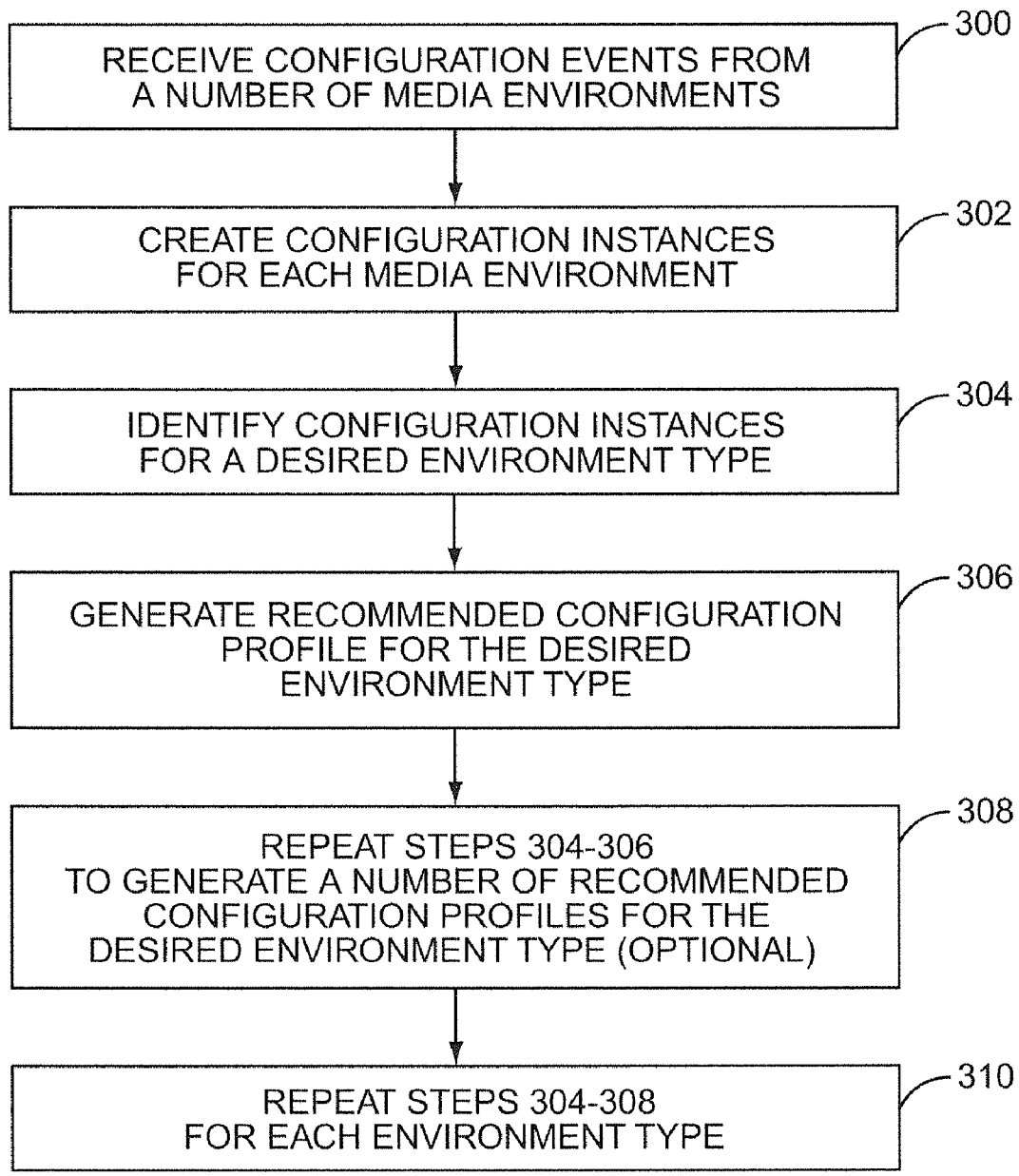
FIG. 4 illustrates the operation of the CCS server according to a first embodiment of the present invention.

FIG. 4 illustrates the operation of the CCS server 24 according to a first embodiment of the present invention. In this embodiment, the CCS server 24 operates to generate recommended configuration profiles for each of a number of known environment types based on the configuration events from the media environments 14-18 mapped to the known environment types. More specifically, the CCS server 24 first receives configuration events from the media environments 14-18 (step 300). Next, the CCS server 24 generates configuration instances for each media environment 14-18 (step 302). In one embodiment, a configuration instance is an average configuration of one of the media environments 14-18 during playback of a particular media presentation. In other words, the CCS server 24 generates the configuration instances for the media environments 14-18 by identifying the configurations that were in effect at the media environment 14-18 for the longest period of time during playback of a particular media presentation. Thus, if the CCS server 24 has configuration events from the media environment 14 for ten media presentations, the CCS server 24 generates configuration instances for the media environment 14 for each of the ten media presentations by identifying the configurations that were in effect at the media environment 14 for the longest period of time during playback of each of the ten media presentations. In another embodiment, the CCS server 24 may generate a single configuration instance for each of the media environments 14-18. More specifically, the CCS server 24 may generate a configuration instance for the media environment 14 by identifying the configurations that were in effect at the media environment 14 for the longest period of time over all media presentations.

Next, the CCS server 24 identifies configuration instances for a desired environment type (step 304). The desired environment type is one of the number of known environment types, wherein each of the media environments 14-18 are mapped to one of the known environment types. For example, if the media environments 14 and 16 are mapped to the desired environment type, then the CCS server 24 identifies the configuration instances for the media environments 14 and 16 as configuration instances for the desired environment type.

The CCS server 24 then generates a recommended configuration profile for the desired environment type based on the identified configuration instances (step 306). The recommended configuration profile is a single set of recommended configurations for the media environment 14-18 mapped to the desired environment type. The recommended configuration profile may be generated based on all configuration instances for the desired environment type or a subset thereof. More specifically, in one embodiment, all of the configuration instances for all media presentations are aggregated to provide a recommended configuration profile for the desired environment type. The recommended configuration profile may be generated by averaging the configurations of the configuration instances to provide an average configuration instance.

In another embodiment, the recommended configuration profile may be generated based on a desired subset of the configuration instances. More specifically, the configuration instances may be filtered based on criteria such as, but not limited to, media presentation, environment ID, primary user, popularity, primary user skill level (ex. expert, novice), demographic information, user preferences, or any combination thereof. The CCS server 24 may then generate the recommended configuration profile based on the filtered configuration instances. Note that as an alternative, the CCS server 24 may filter the configuration events rather than the configuration instances and generate the configuration instances based on the filtered configuration events. Once generated, the configuration profile may thereafter be provided to any of the media environments 14-18 mapped to the desired environment type for automatic configuration of the media environments 14-18.

Optionally, the CCS server 24 may then repeat steps 304-306 to generate any number of recommended configuration profiles for the desired environment type (step 308). This step may be beneficial where the configuration instances are filtered, and the recommended configuration profile is generated based on the filtered configuration instances. In each iteration of steps 304-306, the criteria used to filter the configuration instances is changed to provide a new recommended configuration profile. For example, a separate recommended configuration profile may be generated for each of a number of media presentations. Further, for each of the number of media presentations, an expert recommended configuration profile may additionally be generated using the configuration instances from the media environments 14-18 of the primary users rated as experts. The primary users may rate themselves as experts, novice, or the like. Alternatively, the CCS server 24 may receive feedback regarding configurations and rate the primary users associated with the configurations as expert, novice, or the like based on the feedback. As another example, separate recommended configuration profiles may be generated for each of a number of predetermined user groups. For example, based on demographic information provided by the users, the CCS server 24 may generate separate recommended configuration profiles for persons having hearing disabilities, for children and adults, for different age groups, for users having similar interests, and the like.

At this point, the CCS server 24 may repeat steps 304-308 to generate one or more recommended configuration profiles for each of the known environment types (step 310). Thereafter, when recommended configurations are desired for any of the media environments 14-18 or a new media environment mapped to one of the known environment types, the associated CCS client 42, 62 may request recommended configurations from the CCS sever 24. Note that the request may be sent to the CCS server 24 automatically or at the request of the user. For example, the request may automatically be generated by the CCS client 42, 62 after installation, each time the CCS client 42, 62 is activated, upon detecting the selection of a media presentation for playback, or upon detecting the recording of a media presentation. If more than one recommended configuration profile is available for the environment type, the user associated with the media environment may select, or the CCS client 42, 62 may automatically select, one of the recommended configuration profiles. Alternatively, one of the recommended configuration profiles may be automatically selected by the CCS server 24 based on criteria provided in the request. The selected recommended configuration profile may then be used by the CCS client 42, 62 to automatically configure the media environment.

Figure 5:
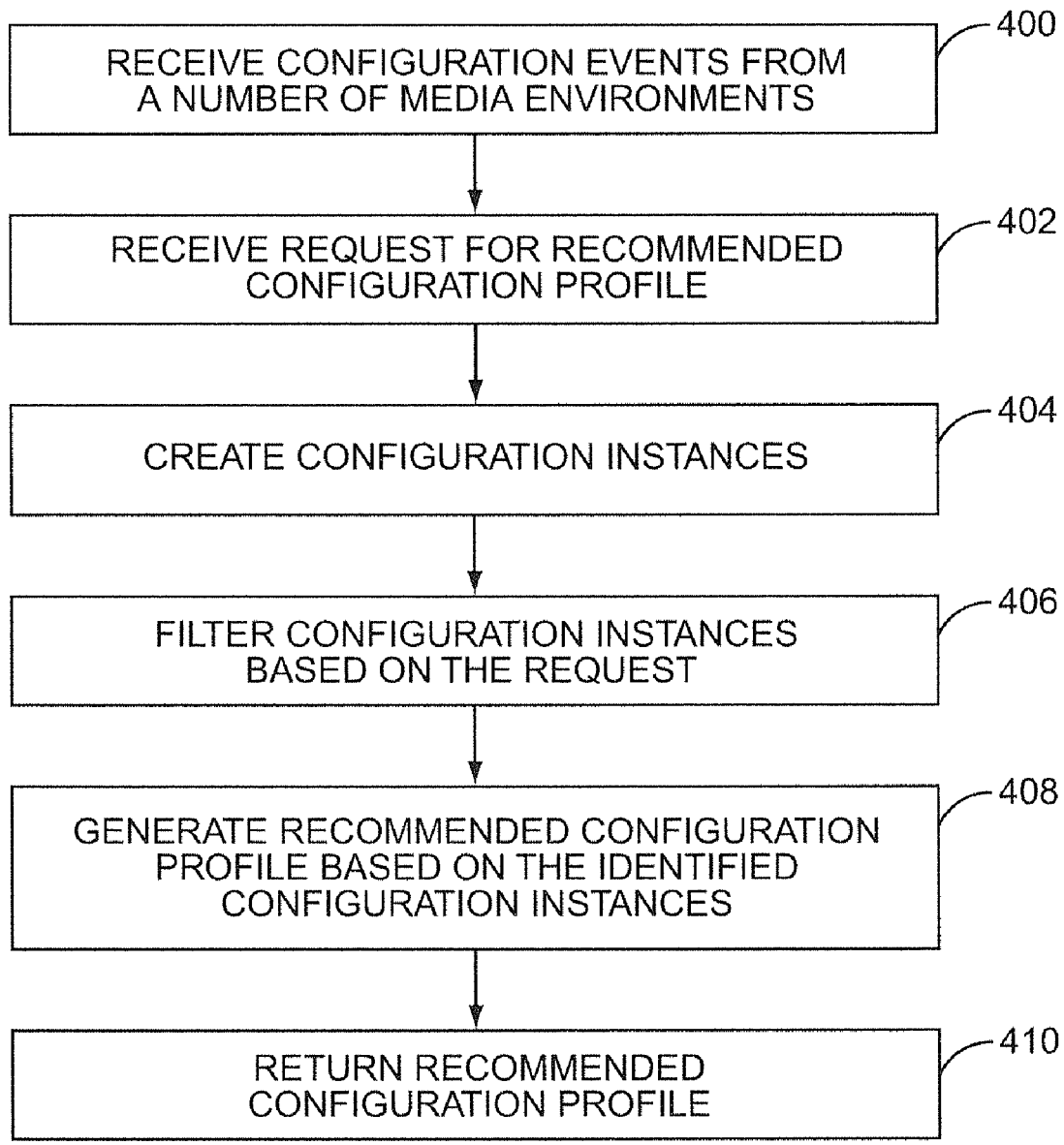
FIG. 5 illustrates the operation of the CCS server according to a second embodiment of the present invention.

FIG. 5 illustrates the operation of the CCS server 24 according to a second embodiment of the present invention. In this embodiment, one or more recommended configuration profiles are generated in response to a request for recommended configurations. More specifically, the CCS server 24 first receives configuration events from the media environments 14-18 (step 400).

The CCS server 24 then receives a request for a recommended configuration profile (step 402). For this discussion, the request is received from the CCS client 62 at the media environment 18. The request identifies the media environment 18 and may optionally include criteria to be used to generate a customized recommended configuration profile. The criteria may include, but is not limited to, a media presentation to be played by the media player 60, environment IDs of other media environments, time of day, one or more other primary users, a primary user skill level (ex. expert, novice) of the primary users associated with the media environment on which the configuration events were generated, demographic information, user preferences, or any combination thereof.

In addition, the criteria in the request may include information instructing the CCS server 24 to generate the recommended configurations based on configuration events or configuration instances from other media environments 14-18 having primary users "like" the primary user of the media environment 18. The CCS server 24 may identify the primary users "like" the primary user of the media environment 18 based on demographic information stored in the user profiles of the primary users. The other primary users may be identified based on disabilities, such as a hearing disability, age, user interests or hobbies, favorite movie genre, or the like, or any combination thereof.

The request from the CCS client 62 may be generated by the user associated with the CCS client 62 or automatically generated by the CCS client 62. For example, the request may automatically be generated by the CCS client 62 after installation, each time the CCS client 62 is activated, upon detecting the selection of a media presentation for playback, or upon detecting the recording of a media presentation. Note that by automatically requesting recommended configurations upon detecting the recording of the media presentation, the CCS client 62 may obtain a recommended configuration profile for the recorded media presentation prior to playback. As a result, the recommended configuration profile for the recorded media presentation may be immediately available when playback is desired.

In response to the request, the CCS server 24 generates configuration instances for each of the media environments 14-18 mapped to one of the known environment types to which the media environment 18 has been mapped (step 404). As discussed above, in one embodiment, a configuration instance is an average configuration of one of the media environments 14-18 during playback of a particular media presentation. In other words, the CCS server 24 generates the configuration instance by identifying the configurations that were in effect at the media environment 14-18 for the longest period of time during playback of a particular media presentation. In another embodiment, the CCS server 24 may generate a single configuration instance for each of the media environments 14-18.

In addition, prior to generating the configuration instances, the configuration events may be filtered based on criteria provided in the request. The criteria may include, but is not limited to, a media presentation to be played by the media player 60, environment IDs of other media environments, time of day, one or more other primary users, a primary user skill level (ex. expert, novice) of the primary users associated with the media environment on which the configuration events were generated, demographic information, user preferences, or any combination thereof. If filtering is desired, the configuration instances are generated based on the filtered configuration events.

Optionally, the CCS server 24 may filter the configuration instances (step 406). This may be desired when the configuration events are not filtered prior to generating the configuration instances. As with filtering the configuration events, the criteria used to filter the configuration instances may include, but is not limited to, a media presentation to be played by the media player 60, environment IDs of other media environments, one or more other primary users, a primary user skill level (ex. expert, novice) of the primary users associated with the media environment on which the configuration events were generated, demographic information, user preferences, or any combination thereof.

Next, the CCS server 24 generates a recommended configuration profile based on the configuration instances (step 408). The recommended configuration profile is a single set of recommended configurations for the media environment 18. The recommended configuration profile may be generated based on all configuration instances for the known environment type to which the media environment 18 has been mapped or a subset thereof. More specifically, in one embodiment, all of the configuration instances for the media environments 14-18 mapped to the known environment type to which the media environment 18 has been mapped are aggregated to provide a recommended configuration profile for the known environment type. In another embodiment, the recommended configuration profile may be generated based on a desired subset of the configuration instances. More specifically, the configuration instances for the known environment type may be filtered based on criteria such as, but not limited to, media presentation, environment ID, primary user, popularity, user rating, primary user skill level (ex. expert, novice), demographic information, user preferences, or any combination thereof. As stated above, the criteria may be provided by the CCS client 62 in the request. The CCS server 24 may then generate the recommended configuration profile based on the filtered configuration instances. Note that as an alternative, the CCS server 24 may filter the configuration events rather than the configuration instances and generate the configuration instances based on the filtered configuration events.

The recommended configuration profile is then returned to the CCS client 62 (step 410). The CCS client 62 then uses the recommended configuration profile to automatically configure the media player 60, the device 56, and the device 58.

While the embodiment discussed above with respect to FIG. 5 focuses on the generation of a single recommended configuration profile, the present invention is not limited thereto. The CCS server 24 may generate a number of recommended configuration profiles using various ones or combinations of criteria either predetermined by the CCS server 24 or provided to the CCS server 24 in the request. The number of recommended configurations, or descriptions thereof, may then be provided to the CCS client 62. The CCS client 62 may automatically select one of the recommended configuration profiles or interact with the primary user to select one of the recommended configuration profiles. The CSS client 62 then uses the recommended configuration profile to automatically configure the media player 60, the device 56, and the device 58.

Figure 6:
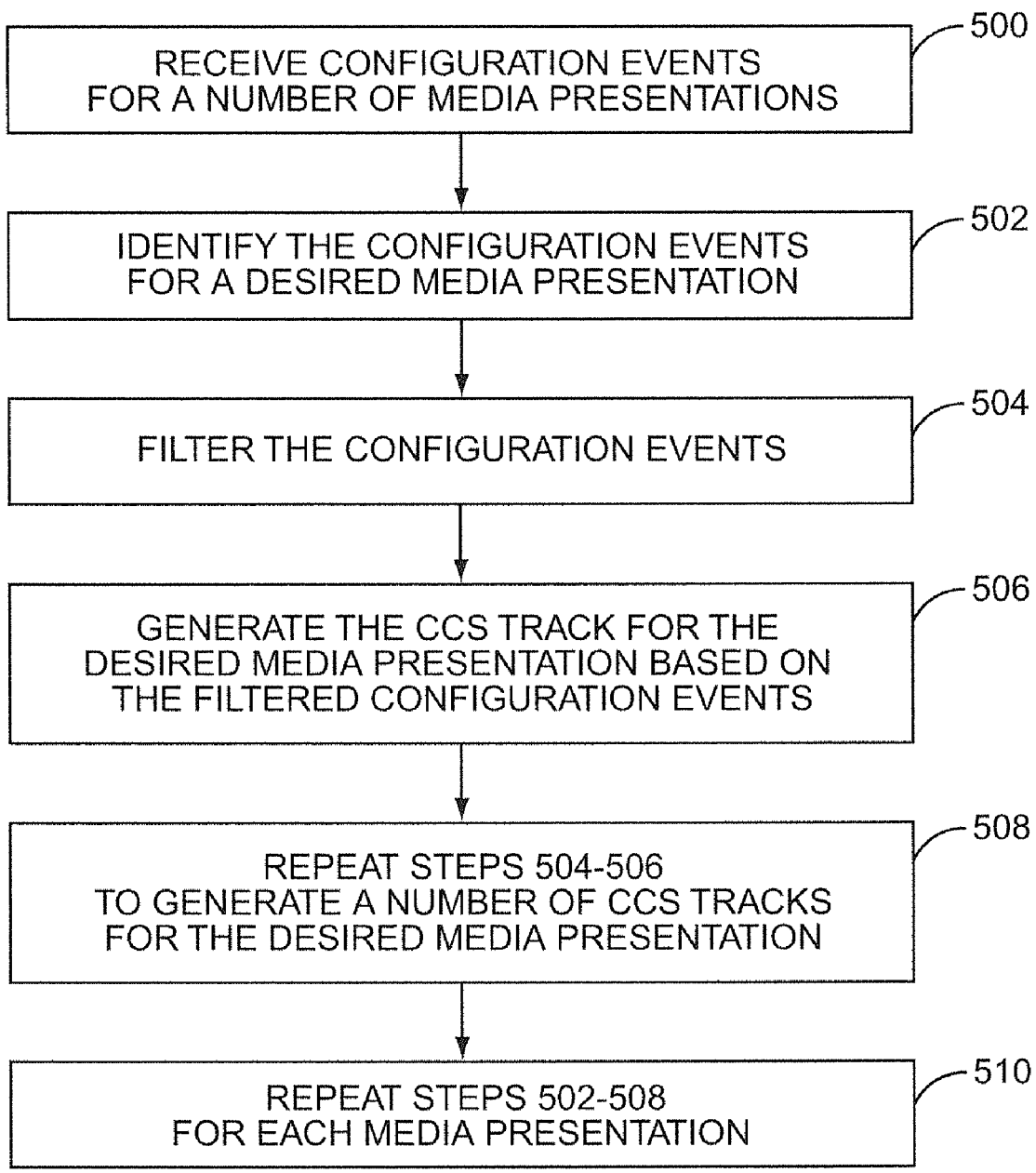
FIG. 6 illustrates the operation of the CCS server according to a third embodiment of the present invention.

FIG. 6 illustrates the operation of the CCS server 24 according to a third embodiment of the present invention. In this embodiment, the CCS server 24 pre-builds one or more CCS tracks for a number of media presentations prior to receiving a request for CCS tracks. A CCS track is a set of configurations associated with a media presentation providing initial configurations to be applied prior to or at the beginning of playback of the media presentation and configuration changes for a number of time slices of the media presentation.

First, the CCS server 24 receives configuration events from a number of media environments, such as the media environments 14-18, during playback of media presentations (step 500). Next, the CCS server 24 identifies configuration events for a desired media presentation by, for example, querying the CCS events database 26 (step 502). Optionally, the CCS server 24 may filter the configuration events for the desired media presentation based on predetermined criteria for a desired CCS track (step 504). It should be noted that steps 502-504 may be implemented as a single query. However, for clarity, steps 502-504 are illustrated as separate steps. The criteria used to filter the configuration events may include, but is not limited to, environment type, environment ID, time of day, primary user, primary user skill level (ex. expert, novice), demographic information, user preferences, or any combination thereof. For example, the CCS server 24 may filter the configuration events for the desired media presentation to identify the configuration events from the media environments 14-18 mapped to a desired environment type. As another example, the CCS server 24 may additionally or alternatively filter the configuration events for the desired media presentation to identify the configuration events from the media environments 14-18 with primary users having desired demographic information, interests, or the like. For example, the CCS server 24 may identify the configuration events from media environments of a desired environment type having primary users who enjoy Sci-Fi movies and that are at least 40 years old.

The CCS server 24 then generates the CCS track using the filtered configuration events (step 506). The CCS track is then stored in the CCS tracks database 30 such that it is available for future use. As discussed below, the CCS server 24 may use the filtered configuration events to generate the CCS track by first associating the filtered configuration events with time slices of the media presentation based on times during playback at which the configuration events occurred. The time slices may, for example, correspond to five-minute segments of the media presentation. Then, the CCS track may be generated such that, for each time slice, one or more configuration events from the filtered configuration events for that time slice are used to automatically configure the media environment during playback. Note that multiple configuration events may be selected for each time slice if the configuration events are capable of co-existing. For example, two volume change events may not be able to co-exist within a single time slice, whereas a volume change, an equalizer configuration change, and a display setting change can co-exist during a single time slice.

At this point, steps 504-506 may be repeated to generate any number of CCS tracks for the desired media presentation (step 508). Each iteration of steps 504-506 includes different criteria for the filtering process of step 504. Further, the CCS server 24 may generate high, medium, and low density versions of each CCS track. A high density version has short time slices. A medium density version has a medium length time slice. A low density version has a large time slice length.

After generating the desired CCS tracks for the media presentation, the CCS server 24 may then repeat steps 502-

508 to generate one or more CCS tracks for each of a number of media presentations (step 510). As a result, one or more CCS tracks for each media presentation having corresponding configuration events are generated and stored in the CCS tracks database 30. As such, when a request for CCS tracks for one of the media presentations is received by the CCS server 24, the CCS server 24 queries the CCS tracks database 30 to obtain at least a subset of the CCS tracks for the media presentation and returns the CCS tracks to the requesting node.

The request for CCS tracks from, for example, the CCS client 62 may be generated by the user associated with the CCS client 62 or automatically generated by the CCS client 62. The request may automatically be generated by the CCS client 62 upon detecting the selection of a media presentation for playback or upon detecting the recording of a media presentation. Note that by automatically requesting the CCS tracks upon detecting the recording of the media presentation, the CCS client 62 may obtain one or more CCS tracks for the recorded media presentation prior to playback. As a result, the CCS tracks for the recorded media presentation may be immediately available when playback is desired.

Note that a request for CCS tracks received by the CCS server 24 may include criteria in addition to information identifying the media presentation such that only a subset of the CCS tracks for the media presentation are returned. For example, the request may indicate that only CCS tracks having a user rating above a predetermined threshold are to be provided. The user ratings of the CCS tracks may be determined by the CCS server 24 based on feedback from users having previously used the CCS tracks, where the feedback may be provided via the CCS client 42. As another example, the request may indicate that only CCS tracks generated based on configuration events from media environments 14-18 having primary users enjoying science fiction movies and that are at least 40 years old are desired.

Figure 7:
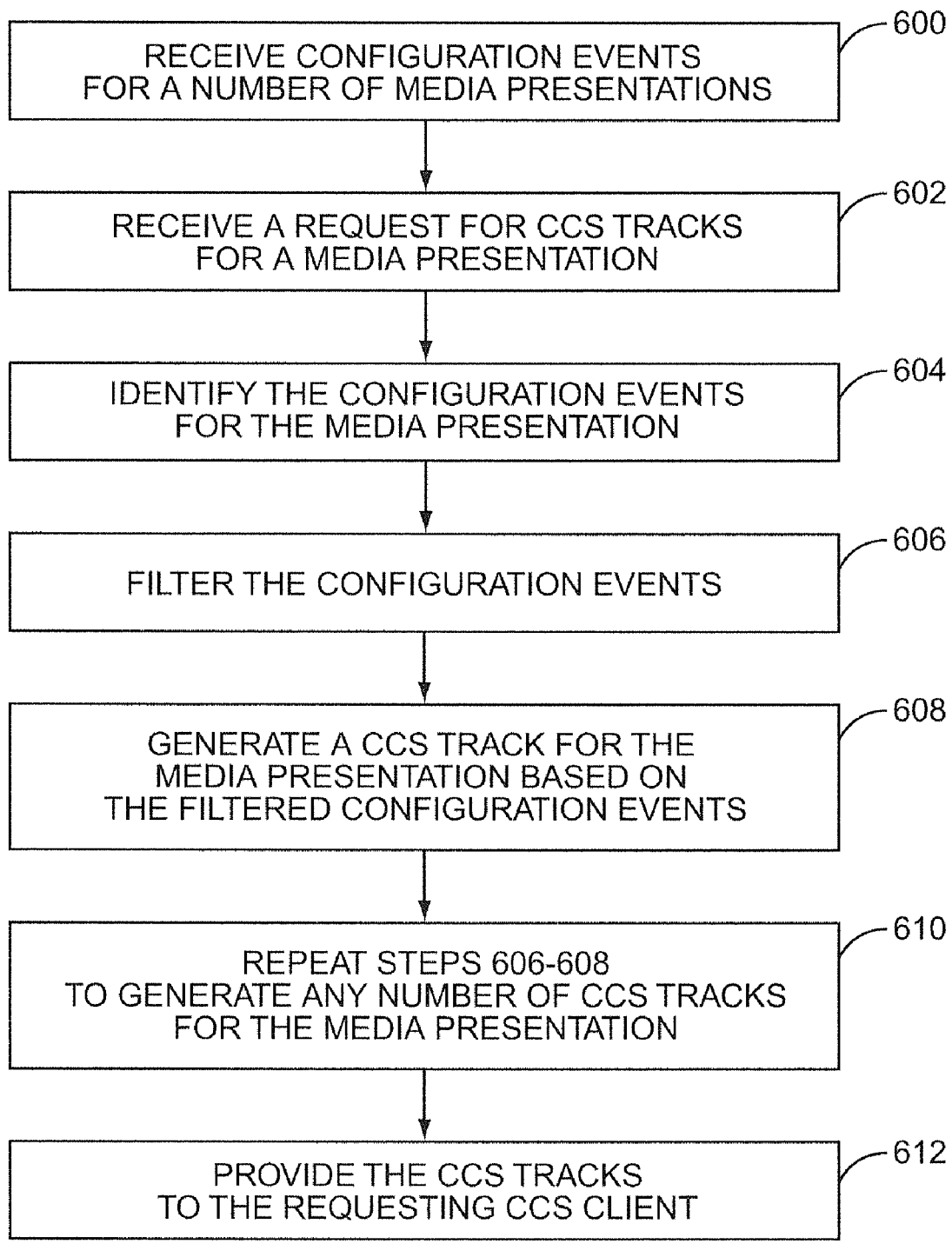
FIG. 7 illustrates the operation of the CCS server according to a fourth embodiment of the present invention.

FIG. 7 illustrates the operation of the CCS server 24 according to a fourth embodiment of the present invention. In this embodiment, the CCS server 24 operates to generate CCS tracks dynamically in response to a request for recommended configurations from, for example, the CCS client 62 at the media environment 18. First, the CCS server 24 receives configuration events from a number of media environments, such as the media environments 14-18, during playback of a number of media presentations (step 600). At some point in time, the CCS server 24 receives a request for CCS tracks from, for example, the CCS client 62 within the media environment 18 (step 602). The request may be generated by the user associated with the CCS client 62 or automatically generated by the CCS client 62 upon detecting the selection of a media presentation for playback or upon detecting the recording of a media presentation. Note that by automatically requesting CCS tracks upon detecting the recording of the media presentation, the CCS client 62 may obtain the CCS tracks for the recorded media presentation prior to playback. As a result, the CCS tracks for the recorded media presentation may be immediately available when playback is desired.

The request from the CCS client 62 includes information identifying a media presentation for which one or more CCS tracks are desired. In addition, the request may include criteria to be used by the CCS server 24 in filtering the configuration events for the media presentation in order to generate CCS tracks for the media presentation. The criteria may include, but are not limited to, environment type, environment ID, time of day, primary user, popularity, user rating, primary user skill level (ex. expert, novice), demographic information, user preferences, or any combination thereof. The popularity of a CCS track may be determined by the CCS server 24 based on feedback from the media environments 14-18 regarding the number of times that the CCS track has been used to configure the media environments 14-18. The user rating of a CCS track may determined by the CCS server 24 based on user feedback. The criteria may be defined by the user associated with the CCS client 62 or automatically generated by the CCS client 62 based on detected preferences or tendencies of the user. The detected user preferences and tendencies of the user may be identified by the CCS client 62 based on a user history maintained by the CCS client 62 describing past actions taken by the user. These past actions may be, but are not limited to, CCS track selection and previous criteria defined by the user for CCS track generation.

Next, the CCS server 24 identifies configuration events for a desired media presentation by, for example, querying the CCS events database 26 (step 604). Optionally, the CCS server 24 may then filter the configuration events for the desired media presentation to identify configuration events for a CCS track (step 606). In one embodiment, the CCS server 24 filters the configuration events based on the criteria provided in the request. Additionally or alternatively, the CCS server 24 may filter the configuration events based on criteria known or determined by the CCS server 24. As an example, the CCS server 24 may filter the configuration events for the desired media presentation to identify the configuration events from media environments 14-18 with primary users having desired demographic information, interests, or the like. For example, the CCS server 24 may identify configuration events associated with primary users who enjoy science fiction movies and that are at least 40 years old. It should be noted that steps 604-606 may be performed using a single query to the CCS events database 26. However, they are illustrated as separate steps for clarity and ease of understanding.

The CCS server 24 then generates a CCS track for the desired media presentation based on the filtered configuration events (step 608). The CCS track may optionally be stored in the CCS tracks database 30 such that it is available for future use. At this point, steps 606-608 may optionally be repeated to generate any number of CCS tracks for the desired media presentation (step 610). Each iteration of steps 606-608 includes different criteria for the filtering process of step 606. The criteria for each iteration, or each desired CCS track, may be provided in the request. Alternatively, the criteria for each iteration may be provided by selecting different combinations of the criteria provided in the request or by adding additional criteria to the criteria provided in the request. In addition or alternatively, the CCS server 24 may generate high, medium, and low density versions of each CCS track.

After generating the CCS tracks for the media presentation, the CCS server 24 then provides the CCS tracks to the CCS client 62 (step 612). Alternatively, information describing the CCS tracks may be provided to the CCS client 62 and presented to the user such that the user may select one or more of the CCS tracks to be used to configure the media environment 18 during playback of the media presentation. As a result, only the desired CCS tracks rather than all generated CCS tracks may be downloaded to the CCS client 62.

Figure 8:
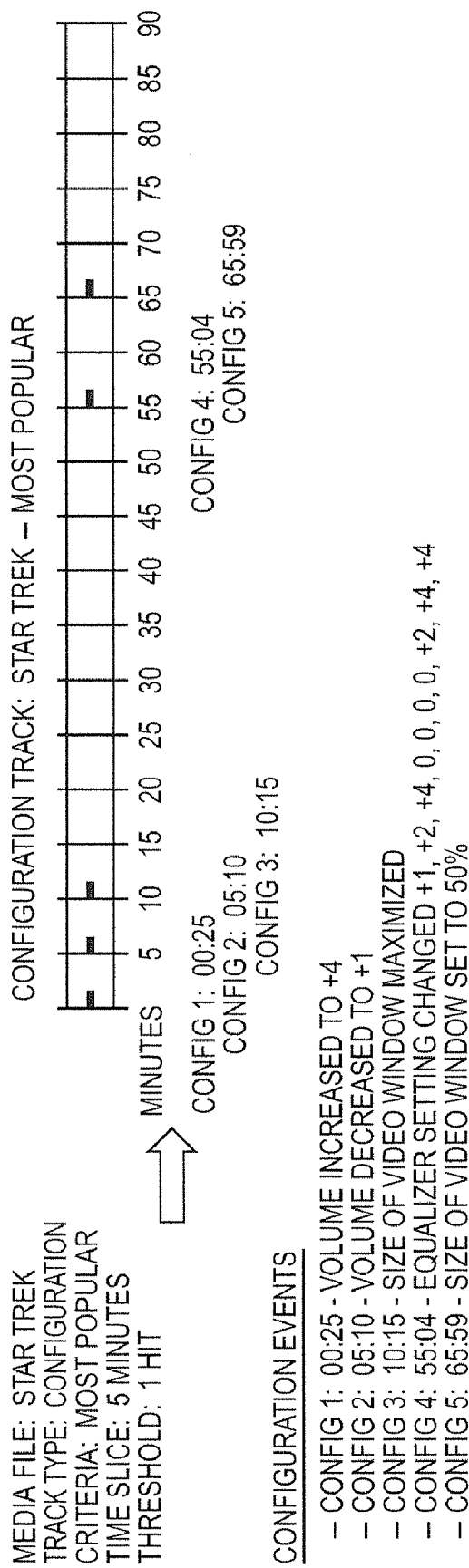
FIG. 8 illustrates an exemplary CCS track according to one embodiment of the present invention.

FIG. 8 illustrates an exemplary CCS track. While only the configuration changes for the time slices of the media presentation are illustrated, the CCS track may additionally include initial configurations for the media environment 18 that may be used to configure the media environment 18 prior to or at the beginning of playback. In this example, the CCS track has been generated by the CCS server 24 for the movie Star Trek. As illustrated, the CCS track is divided into a number of five minute time slices, wherein the time slices of the CCS track are preferably time aligned or synchronized to the media presentation. For each time slice, the most popular configuration event has been selected as the configuration event for the CCS track. As illustrated, the most popular configuration event for the first time slice is "Config 1," which is a volume change of +4. The most popular configuration event for the second time slice is "Config 2," which is a volume change to +1. The most popular configuration event for the third time slice is "Config 3," which is a maximizing of the video window size. For the fourth through eleventh time slices, there are no configuration events in the CCS track. For the twelfth time slice, the most popular configuration event is "Config 4," which a change to the equalizer settings. For the thirteenth time slice, there is no configuration event for the CCS track. The most popular configuration event for the fourteenth time slice is "Config 5," which is a change in the video window size. For the last four time slices, there are no configuration events for the CCS track.

Figure 9:
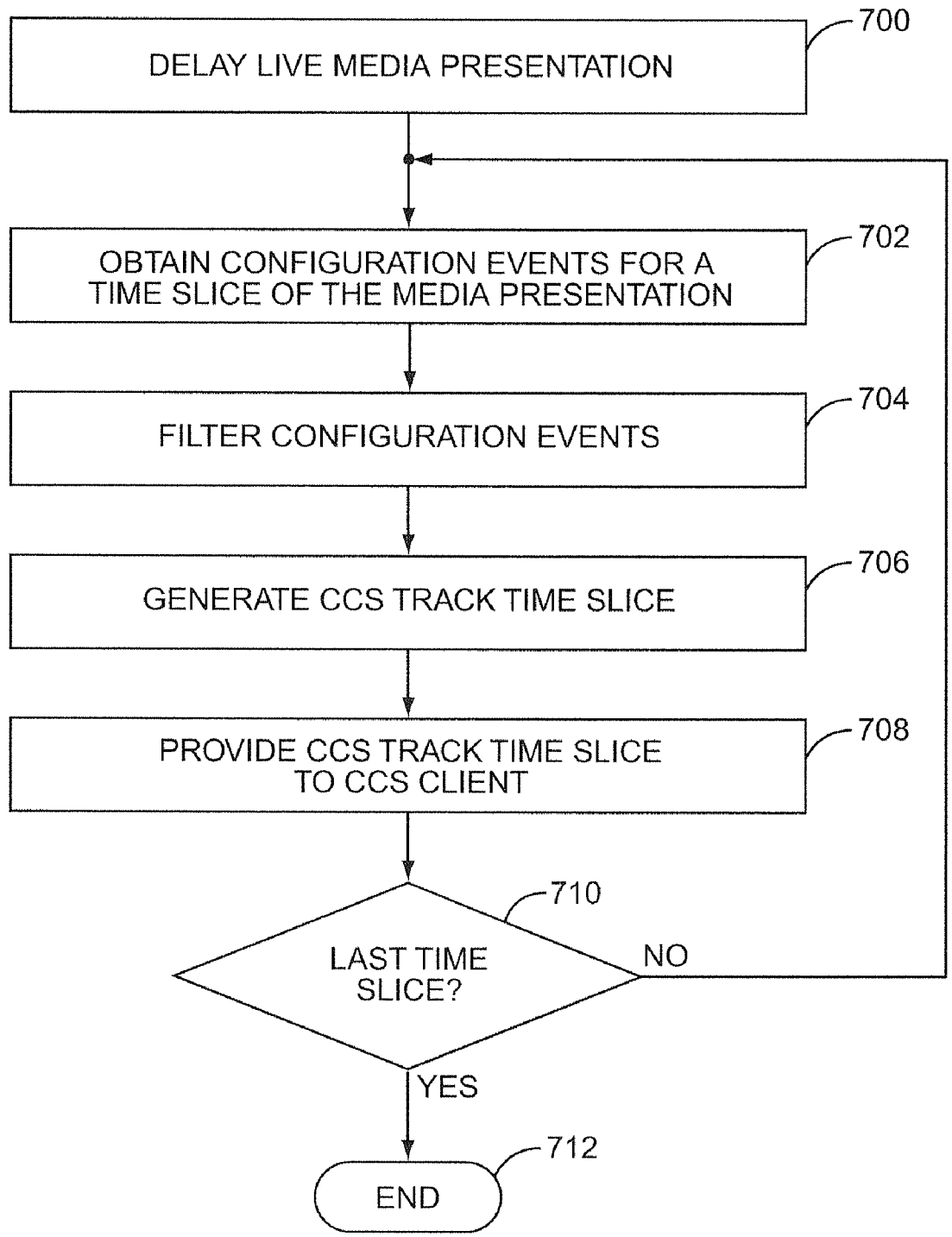
FIG. 9 illustrates the operation of the CCS server according to fifth embodiment of the present invention.

FIG. 9 illustrates the operation of the CCS server 24 to generate CCS tracks according to a fifth embodiment of the present invention. In this embodiment, the CCS server 24 generates CCS tracks for a "near-live" media presentation. More specifically, by delaying a live media presentation by a number of seconds or at most a few minutes, the CCS server 24 may generate one or more CCS tracks for the media presentation. First, the live media presentation is delayed (step 700). As stated above, the live media presentation may be delayed by a number of seconds and at most a few minutes. In one embodiment, the live media presentation is delayed by a time substantially equal to a desired time slice duration, which may be, for example, five minutes. The live media presentation may be delayed, for example, by the media player 60 under control of the CCS client 62 while the CCS server 24 generates the CCS tracks for the live media presentation.

While the media presentation is being delayed, the CCS server 24 obtains configuration events for a first time slice of the live media presentation from other media environments 14-18 at which the user is viewing or listening to the live media presentation in real time (step 702). The CCS server 24 then filters the configuration events as described above (step 704). Using the filtered configuration events, the CCS server 24 generates a time slice of a CCS track for the live media presentation (step 706) and provides the time slice of the CCS track to the requesting CCS client, which may be the CCS client 62 (step 708). Although not illustrated, steps 704-708 may be repeated to generate time slices for any number of CCS tracks for the live media presentation.

Once the first time slice of the CCS track is provided to the CCS client 62, the live media presentation begins playing at the media environment 18 while the time slices of the CCS track generated by the CCS server 24 for the live media presentation begin to be used by the CCS client 62 to configure the media environment 18. Steps 702-708 are repeated to generate successive time slices of the CCS track for the live media presentation until the last time slice of the CCS track for the media presentation is generated and provided to the CCS client 62 (steps 710-712). In this manner, the CCS server 24 is enabled to provide one or more CCS tracks for live, or "near-live," media presentations.

Figure 10:
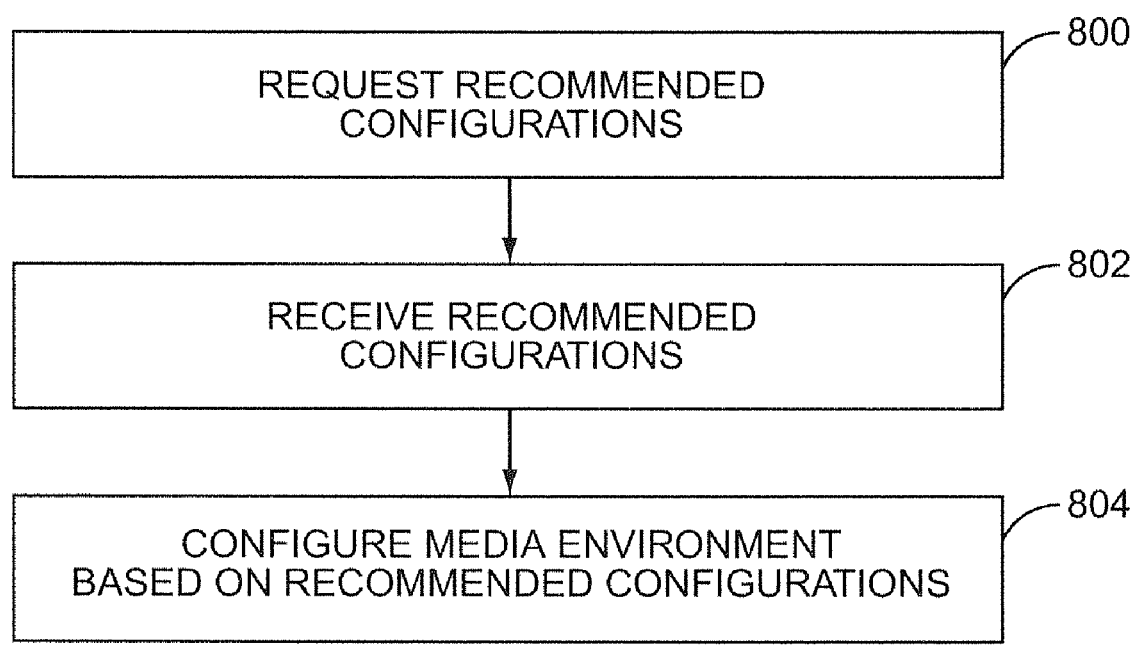
FIG. 10 illustrates the operation of the CCS client to request recommended configurations from the CCS server and configure the media environment based on the recommended configurations according to one embodiment of the present invention.

FIG. 10 illustrates the operation of the CCS client 62 according to one embodiment of the present invention. In general, the CCS client 62 operates to obtain recommended configurations for the media environment 18 from the CCS server 24 and automatically configure the media environment 18 based on the recommended configurations. First, the CCS client 62 queries, or sends a request, to the CCS server 24 for recommended configurations (step 800). The request may be initiated by the user or automatically generated by the CCS client 62. The CCS client 62 may automatically generate and send the request when, for example, the CCS client 62 detects that a media presentation has been selected for playback on the media player 60 or when a media presentation has been selected for recording on the media player 60. Upon selection of a media presentation for playback or recording, the media player 60 provides information identifying the media presentation to the CCS client 62.

The request for recommended configurations provided from the CCS client 62 to the CCS server 24 includes information identifying the media environment, such as the environment ID of the media environment 18. In addition, the request may include criteria for selecting pre-built recommended configurations or for dynamically generating recommended configurations. The criteria may include, but is not limited to, information identifying the media presentation, one or more environment IDs of other media environments 14-18, time of day, information identifying one or more primary users, a desired popularity of the recommended configurations or the configuration events used to generate the recommended configurations, a desired user rating of the recommended configurations or configuration events used to generate the recommended configurations, a desired primary user skill level (ex. expert, novice) of the configuration events used to generate the recommended configurations, demographic information, user preferences, or any combination thereof.

Once the CCS server 24 has obtained the desired recommended configurations from the one of the databases 28 or 30 or generated the desired recommended configurations in response to the request, the recommended configurations are provided to and received by the CCS client 62 (step 802). The recommended configurations may be either one or more recommended configuration profiles or one or more CCS tracks, as discussed above. The CCS client 62 then configures the media environment 18 based on the recommended configurations (step 804). More specifically, the CCS client 62 configures the media player 60 and the devices 56 and 58 based on the recommended configurations from the CCS server 24.

In one embodiment, the CCS client 62 may additionally filter the recommended configurations based on the capabilities of the media player 60 and the devices 56 and 58 before configuring the media environment 18. This may be beneficial where the capabilities of the media player 60 or the devices 56 or 58 do not perfectly match the capabilities of the devices in the known environment type to which the media environment 18 is mapped.

In another embodiment, the CCS client 62 may customize, or adjust, the recommended configurations from the CCS server 24 based on user preferences. For example, the user at the media environment 18 may have a hearing disability. As a result, any volume configurations may be adjusted to increase the volume configurations by a predetermined amount. For example, a volume configuration of +1 may automatically be adjusted to +3. In contrast, the user may be particularly sensitive to sound and desire that all volume configurations be reduced by a predetermined amount. Note that the customization, or adjustment, of the recommended configurations may alternatively be performed by the CCS server 24 prior to providing the recommended configurations to the CCS client 62.

Figure 11:
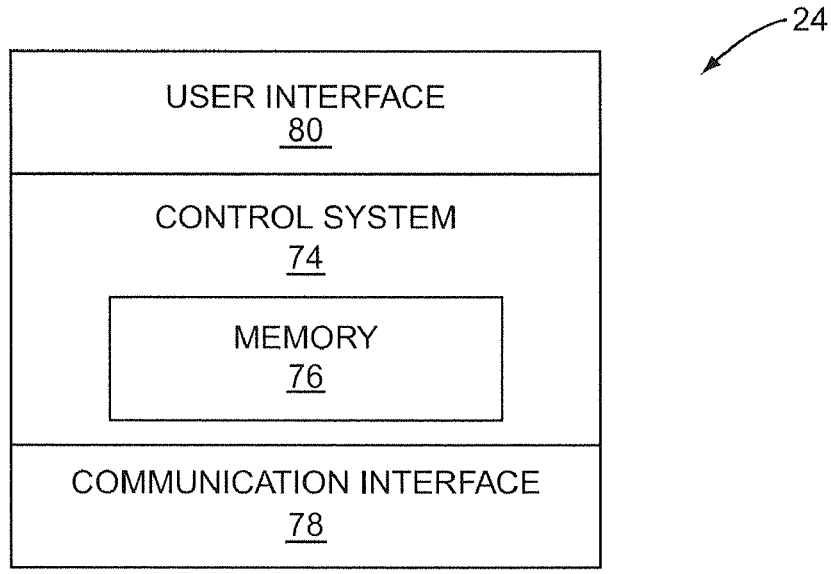
FIG. 11 is a block diagram of an exemplary embodiment of the CCS server according to one embodiment of the present invention.

FIG. 11 is a block diagram of the CCS server 24 according to one embodiment of the present invention. In general, the CCS server 24 includes a control system 74 having associated memory 76. The memory 76 preferably stores software instructing the CCS server 24 to operate according to the present invention. The CCS server 24 also includes a communication interface 78 communicatively coupling the CCS server 24 to the network 22 (FIG. 1). The CCS server 24 may also include a user interface 80 including components such as, but not limited to, a display, user input devices, and the like.

Figure 12:
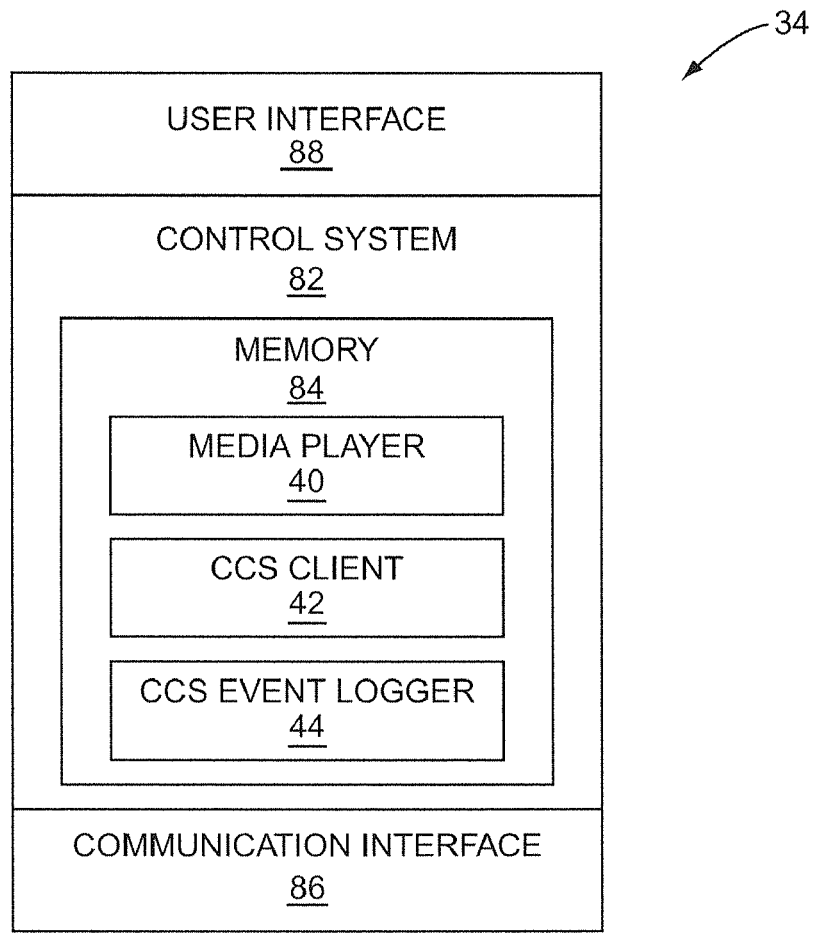
FIG. 12 is a block diagram of an exemplary embodiment of a primary playback system according to one embodiment of the present invention.

FIG. 12 is a block diagram of the primary playback system 34 according to one embodiment of the present invention. It should be noted that this discussion is equally applicable to the primary playback system of the media environment 16 and the primary playback system 54 of the media environment 18. In this exemplary embodiment, the primary playback system 34 includes a control system 82 having associated memory 84. In this embodiment, the media player 40, the CCS client 42, and the CCS event logger 44 are each implemented in software and are stored in memory 84. The primary playback system 34 also includes a communication interface 86 communicatively coupling the primary playback system 34, and at least the CCS client 42, to the network 22 (FIG. 1). The primary playback system 34 also includes a user interface 88 including components such as, but not limited to, a display, a user input device, speakers, and the like.

Figure 13:
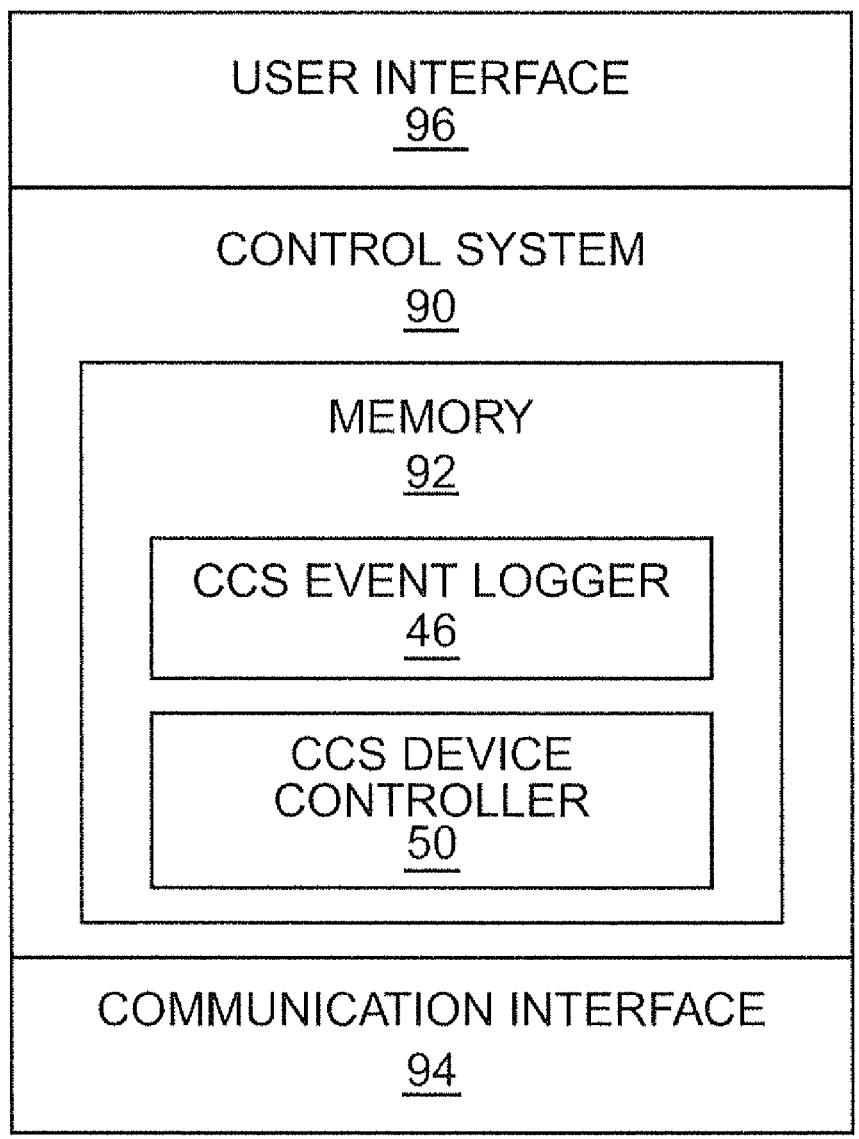
FIG. 13 is a block diagram of an exemplary embodiment of a device associated with the primary playback system in the media environment according to one embodiment of the present invention.

FIG. 13 is a block diagram of the device 36 according to one embodiment of the present invention. It should be noted that this discussion is equally applicable to the devices 38, 56, and 58 within the media environments 14 and 18 and the like devices within the media environment 16. In general, the device 36 includes a control system 90 having associated memory 92. In this example, the CCS event logger 46 and the CCS device controller 50 are implemented in software and stored in the memory 92. The device 36 also includes a communication interface 94 communicatively coupling the device 36 to the primary playback system 34, and at least the CCS client 42. The communication interface 94 may optionally couple the device 36 to the network 22 (FIG. 1). The device 36 also includes a user interface 96 including components such as, but not limited to, a display, user input devices, speakers, and the like.

The present invention provides substantial opportunity for variation without departing from the spirit or scope of the present invention. For example, while the discussion of the system 10 herein focuses on a centrally hosted system, the present invention is not limited thereto. The present invention may alternatively be implemented in a peer-to-peer system wherein the generation and storage of the recommended configuration is distributed among the primary playback systems 34, 54.

Those skilled in the art will recognize improvements and modifications to the preferred embodiments of the present invention. All such improvements and modifications are considered within the scope of the concepts disclosed herein and the claims that follow.

What is claimed is:

1. A playback device comprising:
  a hardware processor; and
  a control system associated with the hardware processor, the control system configured to:
    send a configuration request for a configuration of the playback device, the playback device being associated with a first media environment;
    receive a recommended configuration setting, wherein the recommended configuration setting is based on a configuration setting of a second media device located in a second media environment separate from the first media environment; and
    automatically configure the playback device based on the recommended configuration setting.

2. The playback device of claim 1, wherein the configuration request includes criterion for selecting the recommended configuration.

3. The playback device of claim 2, wherein the criterion is at least one criterion selected from the group consisting of: a media presentation associated with desired ones of the configuration instances, at least one environment identifier associated with desired ones of the configuration instances, at least one primary user associated with desired ones of the configuration instances, a primary user skill level associated with desired ones of the configuration instances, demographic information, and user preferences.

4. The playback device of claim 1, wherein the control system is further configured to:
  receive a plurality of recommended configuration settings; and
  filter the plurality of recommended configuration settings based on capabilities of the playback device.

5. The playback device of claim 1, wherein the control system is further configured to:
  adjust the recommended configuration setting based on a preference of a primary user associated with the playback device.

6. The playback device of claim 1, wherein the first media environment includes a first plurality of media devices and the second media environment includes a second plurality of media devices.

7. The playback device of claim 6, wherein the recommended configuration setting includes recommended configuration settings for the first plurality of media devices based on configuration settings of the second plurality of media devices.

8. The playback device of claim 7, wherein the control system is further configured to:
  automatically configure the first plurality of media devices based on the recommended configuration settings.

9. A method comprising:
  sending a configuration request for a configuration of a playback device that is associated with a first media environment;
  receiving a recommended configuration setting, wherein the recommended configuration setting is based on a configuration setting of a second media device located in a second media environment separate from the first media environment; and
  automatically configuring the playback device based on the recommended configuration setting.

10. The method of claim 9, wherein the configuration request includes criterion for selecting a recommended configuration setting.

11. The method of claim 10, wherein the criterion is at least one criterion selected from the group consisting of: a media presentation associated with desired ones of the configuration instances, at least one environment identifier associated with desired ones of the configuration instances, at least one primary user associated with desired ones of the configuration instances, a primary user skill level associated with desired ones of the configuration instances, demographic information, and user preferences.

12. The method of claim 9, further comprising:
  receiving a plurality of recommended configuration settings; and filtering the plurality of recommended configuration settings based on capabilities of the playback device.

13. The method of claim 9, further comprising:
adjusting the recommended configuration setting based on a preference of a primary user associated with the playback device.

14. The method of claim 9, wherein the first media environment includes a first plurality of media devices and the second media environment includes a second plurality of media devices.

15. The method of claim 14, wherein the recommended configuration setting includes recommended configuration settings for the first plurality of media devices based on configuration settings of the second plurality of media devices.

16. The method of claim 15, further comprising:
automatically configuring the first plurality of media devices based on the recommended configuration settings.

* * * * *